April 8, 1930.　　　　F. A. TEFFT　　　　1,754,066
ELECTRICAL FITTING
Original Filed March 1, 1926
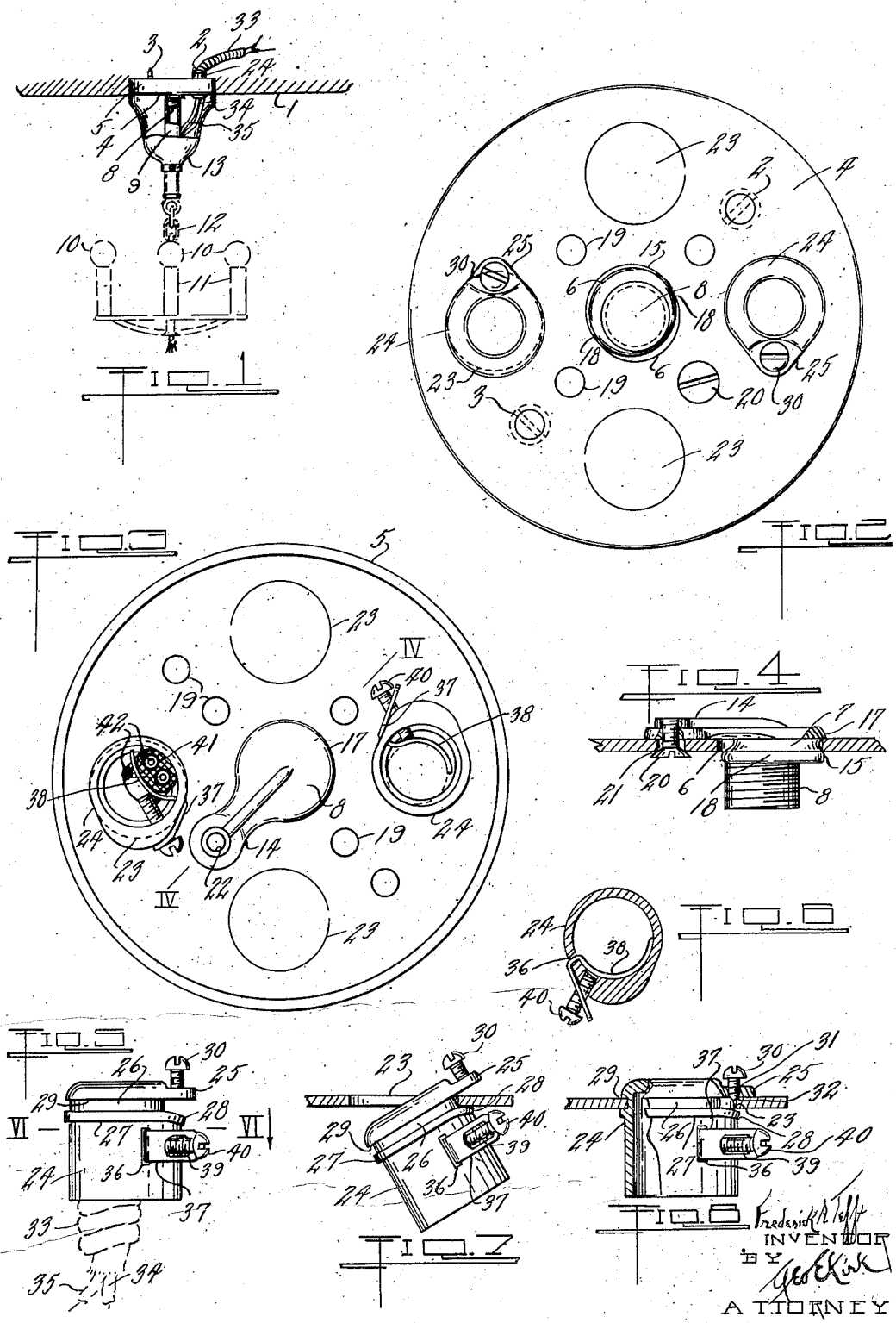

Patented Apr. 8, 1930

1,754,066

UNITED STATES PATENT OFFICE

FREDERICK A. TEFFT, OF TOLEDO, OHIO

ELECTRICAL FITTING

Application filed March 1, 1926, Serial No. 91,428. Renewed February 3, 1930.

This invention relates to electric conductor fittings.

This invention has utility when embodied in outlet boxes or fixture stand mounting and conductor anchoring means.

Referring to the drawings:

Fig. 1 is a fragmentary view, with parts broken away, showing an embodiment of the invention in a fixture mounting plate or support;

Fig. 2 is a view of the supporting side of the plate fixture of Fig. 1, showing elements of the invention incorporated therewith;

Fig. 3 is a view of the opposite side of the plate of Fig. 2;

Fig. 4 is a section on the line IV—IV, Fig. 3;

Fig. 5 is a side elevation of the conductor clamp and anchoring sleeve as shown in Fig. 3;

Fig. 6 is a section on the line VI—VI, Fig. 5;

Fig. 7 is a view of the device of Fig. 5 as being brought toward assembly position; and Fig. 8 is a view of the device of Fig. 5 as assembled, parts being broken away.

Wall 1 is shown as having screws 2, 3, to mount plate or wall 4 having annular flange 5. This plate 4, centrally thereof, has opening 6 adjacent which and therein may be placed seat 7 of element 8 herein shown as externally threaded for mounting electric lighting fixture 9 having electric light bulbs 10 in sockets 11 suspended by chain 12 from the fixture stem or tube 9 as extending from the bell 13. This stud element 8 upon the side of the wall 4 away from this threaded portion, has radially extending arm 14 as beyond a plane of one side of the seat 7, while diametrically opposite from the extent of this arm 14, this element has ledge 15 adjacent the stud side of the wall, and ledge 17 as an overhang upon the same side of the wall 4 as the arm 14. Between the arm 14 and the embracing or opposing ledge portions 15, 17, on opposite sides of the seat 7, this element 8 has the portion 18 thereof adjacent the seat 7 of such dimension that this fitting element may be inserted into the opening 6 from the side of the arm 14.

The plate 4 is shown as having adjacent the opening 6, additional openings 19. Flat head machine screw 20 is shown as having its bevel face 21 to engage with the sides of an opening 19 and with the threaded portion of the screw 20 coating in opening 22 of the arm 14 for threaded engagement. As this screw 20 is run up into position, the element 8 is thrust in the direction of the plane of the wall 4, due to the wedge of the tapered portion 21 of the screw 20 coacting with the opening 19 for thrusting element 8 away from such opening 19 and thus causing the overhang or ledge portions 15, 17, to ride on opposite sides of the wall 4 as the seat 7 is thrust snugly into engagement with the side of the opening 6 remote from the arm 14. This provides a simple anchoring device which may be quickly assembled into holding position with a substantial anchoring action adequate for carrying electric fixtures as may be desired.

The plate 4 is shown as having additional openings 23. Fitting 24 is shown as having arm 25 upon one side of seat 26, as an overhang, while the opposite side of the seat 26 carries flange 27 having offset portion 28 away from the arm 25. This offset portion 28 allows rocking assembly of the tubular fitting 24 into an opening 23 so that this flange or rib 27 may provide a ledge opposing ledge 29 remote from the arm 25. As this sleeve fitting 24 is swung into assembly position with the plate 4 so that the seat 26 is in the plane of the wall 4, this element may be shifted transversely of the opening 23 to have the ledges 27, 29, embrace a portion of the wall 4. Round head machine screw 30 may operate through threaded portion 31 in the arm 25 to have its taper portion 32 ride against a side of the wall opening 23 remote from the ledge embraced portion, thereby wedging a fitting into an opening 23 for holding the seat 26 against the wall 4 remote from this screw 30. This wedge screw action is a quick and simple, as well as effective assembly effecting or mounting means for an electric fitting element as to an outlet box or fixture support.

This structure is one which may be simply and economically produced and assembled with a minimum of time. It is readily adaptable to a range of situations, and in the assembly there is no special tool requirement other than the simple form of screw driver, and the use of such tool may both quickly and effectively give rigid assembly for the fitting element as to the plate.

As herein shown the sleeve fitting element 24 is adaptable for a range of electrical conductors. Armored fitting 33 may have its electrical conductors 34, 35, protrude therefrom and the armored portion 33, as clearing the sleeve 24, be effectively anchored therewith. To this end, this element 24 has opening 36 for clip strap 37. This clip at its inner portion is shown as having arc section 38. The outer portion of this clip 37 has slotted arm 39 through which extends screw 40. The screw 40 in coacting with the slot in the slotted portion 39 precludes accidental displacement or loss of this clip from the element 24. After the armored conduit or conductor 33 is inserted in the element 24, the screw 40 may be rotated against the arc portion 38 of the clip and thrust such into firmly anchoring position with the armored conductor 33.

In the event there be fabric and composition insulation jacket 41 for conductor pair 42, the much smaller diameter requirement for such conductor anchoring may be made effective even with this same fitting element 24. The screw 40 may be operated to throw the arc portion 38 into clamping engagement with the insulation 41 of the conductor pair 42. This arc section 38 of the clamp is preferably of sheet metal and of rigidity to resist springing away from the conductor to be locked thereby into anchoring position.

There is accordingly provided herein not only a simple form of fitting, but one which is adaptable to a wide range of sizes of electrical conductors or electrical conductor pairs effective in a simple manner for snugly locking such conductor into position, while additionally the fitting as a unit may be simply and readily assembled into mounting position with an outlet box or fixture support as may be desired.

What is claimed and it is desired to secure by United States Letters Patent is:

1. An electric fitting comprising a tubular element having near a terminus thereof a peripheral groove, said groove on a common side of the element having a wall thereof away from said terminus providing a flaring portion and the opposite wall of increased overhang as an arm, and a screw through said arm coacting upon rocking assembly of the fitting through a circular opening in a wall to have the wall about the opening embraced by said groove throughout the groove extent with major clearance of the groove at the flaring portion and arm, said screw there operable toward the flaring portion to engage the opening rim and thereby holding the fitting in groove locking alignment with the opening axis.

2. An electric fitting comprising a tubular element having near a terminus thereof a peripheral groove, said groove on a common side of the element having a wall thereof away from said terminus providing a flaring portion and the opposite wall of increased overhang as an arm, a screw through said arm coacting upon rocking assembly of the fitting through a circular opening in a wall to have the wall about the opening embraced by said groove throughout the groove extent with major clearance of the groove at the flaring portion and arm, said screw there operable toward the flaring portion to engage the opening rim and thereby holding the fitting in groove locking alignment with the opening axis, and adjustable means carried by the element and coacting to connect a conductor therewith.

In witness whereof I affix my signature.

FREDERICK A. TEFFT.

CERTIFICATE OF CORRECTION.

Patent No. 1,754,066.  Granted April 8, 1930, to

FREDERICK A. TEFFT.

It is hereby certified that error appears in the printed specification of the above numbered patent requiring correction as follows: Page 2, after line 88, insert the following as claim 3:

3. A connection for a conduit to an outlet box having an opening embodying a fitting comprising a tubular element, a clip in the element interior past which the conduit extends, a first screw for adjusting the clip to grip the conduit in the element, said element having terminally from the clip an endless groove having a flare portion on the side of the groove toward the clip and an arm extension on the side of the groove away from the clip and opposite the flare portion, and a second screw through the arm for wedging the element groove into the opening in the outlet box in thereby rendering the two screws effective for adjustably anchoring the conduit detachably with the outlet box.;

and that the said Letters Patent should be read with this correction therein that the same may conform to the record of the case in the Patent Office.

Signed and sealed this 3rd day of June, A. D. 1930.

(Seal)

M. J. Moore,
Acting Commissioner of Patents.